(12) United States Patent
Sehgal et al.

(10) Patent No.: US 7,715,386 B2
(45) Date of Patent: May 11, 2010

(54) REDUCING NETWORK TRAFFIC TO TEREDO SERVER

(75) Inventors: Amit Sehgal, Kirkland, WA (US); Mohit Talwar, Redmond, WA (US); Kalven Wu, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 460 days.

(21) Appl. No.: 11/724,375

(22) Filed: Mar. 15, 2007

(65) Prior Publication Data

US 2008/0225866 A1 Sep. 18, 2008

(51) Int. Cl.
*H04L 12/28* (2006.01)
*H04J 3/16* (2006.01)

(52) U.S. Cl. .................. 370/389; 370/401; 370/466
(58) Field of Classification Search .............. None
See application file for complete search history.

(56) References Cited

U.S. PATENT DOCUMENTS

| | | | |
|---|---|---|---|
| 6,856,184 B2 | 2/2005 | Hidai | |
| 7,031,328 B2 | 4/2006 | Thubert et al. | |
| 7,363,378 B2 | 4/2008 | Holmes et al. | |
| 2002/0141384 A1* | 10/2002 | Liu et al. | 370/352 |
| 2003/0065791 A1 | 4/2003 | Garg | |
| 2003/0084162 A1* | 5/2003 | Johnson et al. | 709/227 |
| 2003/0206536 A1 | 11/2003 | Maggenti | |
| 2003/0212772 A1 | 11/2003 | Harris | |
| 2004/0128540 A1* | 7/2004 | Roskind | 713/201 |
| 2004/0133692 A1 | 7/2004 | Blanchet et al. | |
| 2004/0139228 A1 | 7/2004 | Takeda et al. | |
| 2004/0153858 A1 | 8/2004 | Hwang | |
| 2004/0190549 A1* | 9/2004 | Huitema | 370/466 |
| 2004/0240468 A1 | 12/2004 | Chin | |
| 2004/0252683 A1* | 12/2004 | Kennedy et al. | 370/389 |
| 2005/0005014 A1* | 1/2005 | Holmes et al. | 709/227 |
| 2005/0015427 A1 | 1/2005 | Guo | |
| 2005/0100047 A1 | 5/2005 | Liu et al. | |
| 2005/0105525 A1 | 5/2005 | Liu | |
| 2005/0105543 A1* | 5/2005 | Ikenaga et al. | 370/428 |
| 2005/0138166 A1 | 6/2005 | Blanchet | |
| 2005/0165963 A1 | 7/2005 | Satzke | |
| 2005/0243801 A1 | 11/2005 | Grubb | |
| 2006/0050700 A1 | 3/2006 | Ravikumar et al. | |
| 2006/0053485 A1* | 3/2006 | Li | 726/11 |
| 2006/0072569 A1 | 4/2006 | Eppinger | |
| 2006/0120375 A1* | 6/2006 | Ravikumar et al. | 370/392 |
| 2006/0182100 A1* | 8/2006 | Li et al. | 370/389 |

(Continued)

FOREIGN PATENT DOCUMENTS

WO   WO 2005088466 A1   9/2005

(Continued)

OTHER PUBLICATIONS

NAT Behavioral Requirements for Unicast UDP draft-ietf-behave-nat-udp-08 http://www.ietf.org/internet-drafts/draft-ietf-behave-nat-udp-08.txt.

(Continued)

*Primary Examiner*—Steven H Nguyen
(74) *Attorney, Agent, or Firm*—Wolf, Greenfield & Sacks, P.C.

(57) ABSTRACT

Methods and systems for reducing network load on a Teredo server.

20 Claims, 9 Drawing Sheets

U.S. PATENT DOCUMENTS

| | | | |
|---|---|---|---|
| 2006/0182111 A1 | 8/2006 | Wahl | |
| 2006/0187912 A1 | 8/2006 | Schwartz | |
| 2006/0215684 A1 | 9/2006 | Capone | |
| 2006/0251088 A1 | 11/2006 | Thubert | |
| 2007/0061485 A1 | 3/2007 | Horton et al. | |
| 2007/0147263 A1* | 6/2007 | Liao et al. .................. | 370/252 |
| 2008/0209051 A1 | 8/2008 | Holmes et al. | |
| 2009/0006648 A1* | 1/2009 | Gopalakrishnan et al. ... | 709/245 |

FOREIGN PATENT DOCUMENTS

WO      WO 2006123218 A2     11/2006

OTHER PUBLICATIONS

Teredo: Tunneling IPv6 over UDP through Network Address Translations (NATs) http://www.rfc-zone.org/rfc4380.html.

Overview of Network Address Translation (NAT) in Windows XP http://www.microsoft.com/technet/prodtechnol/winxppro/deploy/nattrnsv.mspx.

State of Peer-to-Peer(P2P) Communication Across Network Address Translators(NATs) http://www.ietf.org/internet-drafts/draft-ietf-behave-p2p-state-00.txt.

NAT Behavioral Requirements for Unicast UDP draft-ietf-behave-nat-udp-08 http://www.ietf.org/internet-drafts/draft-ietf-behave-nat-udp-08.txt ; Oct. 10, 2006.

Teredo: Tunneling IPv6 over UDP through Network Address Translations (NATs) http://www.rfc-zone.org/rfc4380.html ; Feb. 2006.

Overview of Network Address Translation (NAT) in Windows XP http://www.microsoft.com/technet/prodtechnol/winxppro/deploy/nattrnsv.mspx , Sep. 12, 2005.

State of Peer-to-Peer(P2P) Communication Across Network Address Translators(NATs) http://www.ietf.org/internet-drafts/draft-ietf-behave-p2p-state-00.txt , Oct. 16, 2006.

"IPv6 Features in the Advanced Networking Pack for Windows XP," Microsoft TechNet, downloaded from http://www.microsoft.com/technet/community/columns/cableguy/cg0403.mspx, dated Mar. 31, 2006, 8 pages.

Strater et al., "Seamless Mobility Between Home Networks and Cable Services," downloaded from http://broadband.motorola.com/ips/pdf/Seamless_Mobility.pdf, dated May 27, 2005, pp. 1-15.

"Network Infrastructure Device Implementer's Guide," downloaded from http://download.microsoft.com/download/9/c/5/9c5b2167-8017-4bae-9fde-d599bac8184a/Router_RG_WLAN.doc, dated Aug. 5, 2005, pp. 1-24.

* cited by examiner

REDUCING NETWORK TRAFFIC TO TEREDO SERVER

BACKGROUND OF INVENTION

1. Field of Invention

The invention relates to network communication technologies and, more specifically, to mechanisms that enable IPv4 clients to communicate over an IPv6 network.

2. Discussion of Related Art

Computer networks allow computers and potentially any associated users to communicate electronically throughout the globe over a worldwide amalgamation of networks often referred to as the Internet. A common network protocol used to communicate over the Internet is called the Internet Protocol or "IP" for short. There are a number of different versions of IP including the common IP version 4 (herein also referred to as "IPv4") and the more recently-developed IP version 6 (herein also referred to as "IPv6"). Although IP is used on the Internet, it can be used in a variety of network contexts. IP is also often employed within local networks to connect computers.

In order for one computing system to communicate with another computing system over a particular network, it is important that each computing system be uniquely identified on that network. IPv4 provides a 32 bit addressing mechanism, which should allow for $2_{32}$ or approximately 4 billion different addresses. Practical considerations limit the number of IPv4 addresses to approximately 2 or 3 billion. While this may seem like an unlimited supply of addresses, the proliferation of the Internet and network devices throughout the globe have pushed or exceeded these address limits.

As the pool of available IPv4 addresses has shrunk, various systems have developed to allow multiple computers or devices to share a single external (i.e., directly accessible from the Internet) IP address. One such system is called "Network Address Translation." A Network Address Translation device (also known as a "Network Address Translator" or a "NAT") separates out a number of computing systems in a private network from the rest of the Internet. All computing systems on the Internet that are not in such a private network are required to have a unique IP address that is unique as compared to all other Internet-connected computing systems that are also not behind a NAT. The computing systems in each private network generally have an address that is unique to that private network, but not necessarily to the global Internet. The NAT then translates that private address into a globally unique IP address on the fly as each packet exits the private network through the NAT and into the global Internet. NATs typically alter packets using TCP and UDP port mapping to enable two-way traffic between external hosts and internal clients.

Accordingly, the NAT uses a limited number (potentially just one) globally unique address that it exposes to the Internet, while allowing the network devices that are behind the NAT to have a larger number of private network addresses that need not be globally unique throughout the Internet. The use of NATs therefore allows for a short term solution to the problem of there being a relatively limited number of IPv4 addresses available. Accordingly, IPv4 computing systems and NATs often work together.

Certain address blocks are reserved under IPv4 for NAT-internal use only. For example, the address blocks 10.0.0.0/8, 192.168.0.0/16, 172.16.0.0/12 are all defined in RFC 1918 (entitled "Address Allocation for Private Internets") as reserved for "Private Internets." Generally, a NAT device routes packets to and from a reserved "private" IP address to a world-accessible "public" IP address.

IPv6, on the other hand, has a 128-bit addressing mechanism, which is sufficient to provide unique addresses for well into the anticipated future. Accordingly, the problem associated with a limited number of unique addresses under IPv4 may be addressed by reconfiguring the Internet to operate exclusively under IPv6 instead. Such a reconfiguration will likely occur over an extended period of time because there is significant infrastructural investment in the current Internet that is based on the IPv4 protocol. Furthermore, there is no one governing entity that controls the entire Internet. Accordingly, it is commonly accepted that the Internet needs to concurrently work with both IPv6 and IPv4, at least for the near future. In order to facilitate robust communication over the Internet, mechanisms have been developed that allow for IPv4 computing systems to communicate with IPv6 computing systems.

One mechanism often referred to as the "6to4" mechanism uses IPv6 packets as payload of IPv4 packets. When transitioning from an IPv4 network to an IPv6 network, the IPv6 packet is extracted and transmitted. When transitioning from an IPv6 network to an IPv4 network, the IPv6 packet is included as the payload of an IPv4 packet, and then the IPv4 packet is transmitted. Several problems exist with this 6to4 mechanism. Specifically, it may not work well when the IPv4 computing system that is to communicate is behind a NAT. Many NATs are not programmed to allow the transmission of arbitrary payload types. Accordingly, NATs may not permit communication of a payload in the form of an IPv6 packet. Even when the NAT permits such communication, the local address within the private network cannot be used in a 6to4 scheme. The 6to4 mechanism will work with a NAT if the NAT and 6to4 router are in the same physical box. However, there are many cases in which the NAT may not be easily upgradeable to include a 6to4 routing function.

"Teredo" is another protocol for transporting packets between nodes that support only IPv4 and nodes that support IPv6. Teredo is described in more detail in RFC 4380 (entitled "Teredo: Tunneling IPv6 over UDP through Network Address Translations (NATs)"). Teredo encapsulates IPv6 packets within IPv4 UDP datagrams, which most NATs can forward properly. Thus, IPv6-aware hosts behind NATs can be used as Teredo tunnel endpoints even when they don't have a dedicated public IPv4 address.

The Teredo implementation usually involves a client, a relay, and a server, although a relay is not always necessary. The Teredo client is a device on an IPv6 network. The client is assigned a unique IPv6 address that starts with a specific reserved prefix (2001:0000::/32).

A Teredo relay connects clients on an IPv6 network with an IPv4 network. The relay advertises a route to the Teredo IPv6 prefix to other IPv6 hosts in order to receive traffic from those hosts addressed to any Teredo client. The relay then forwards received packets a UDP datagram within an IPv4 packet. The relay also receives packets from Teredo clients addressed to native IPv6 hosts over UDP/IPv4 and forwards those packets into the native IPv6 network.

A Teredo server is used by a Teredo client both to determine whether the client is behind a NAT (and if so, to determine the type of NAT), and also to "punch holes" in the NAT so that the NAT will allow incoming traffic and forward it to the correct client. "Hole punching" involves initiating a connection from a host behind a NAT to a host external to the NAT so that the NAT will subsequently forward packets received from that external host back to the internal host. Some of the various types of NATs are described below.

A NAT needs to transmit packets both from an internal client to the external destination and in the opposite direction to facilitate communication. Accordingly, it needs some way to identify and match packets received from the outside with specific internal hosts. This is generally accomplished using port mapping. Port mapping can either be manually configured on the NAT, or can occur automatically. There are several different types of NATs that are commonly in use that can be categorized in terms of the system they use for port mapping. These definitions are set out in RFC 3489 (entitled "STUN—Simple Traversal of User Datagram Protocol (UDP) Through Network Address Translators (NATs)").

In the case of a "full cone" NAT, also known as "one-to-one" NAT, all requests that originate from the same internal IP address and port are mapped to the same external IP address and port. An external host can send a packet to the internal host by sending a packet to the mapped external address. For example, if the internal client has a local IP address of 192.168.1.5, and it attempts to connect to a web server on the Internet operating on port 80, the full cone NAT could modify the packet so the source IP address is the external IP address of the NAT device, for example, 151.207.245.67, and the source port could be mapped, usually to some unprivileged port, for example, 2000.

A "restricted cone" NAT is similar to a "full cone" NAT inasmuch as all internal requests from the same host to the same port number are mapped to the same external IP address and source port. Restricted cone NATs have the additional limitation that only external systems that have previously been sent packets are permitted to connect to the internal system. Thus, before an external system can connect to a client within the NAT, the client must have first initiated communication with that external system.

A "port restricted cone" NAT is similar to a "restricted cone" NAT with the additional limitation that external systems can only connect to clients within the NAT on the same port that the internal client used to connect to the external system.

Finally, in a "symmetric" NAT, all requests from the same internal IP address and port to a specific external destination IP address and port are mapped to a unique external source IP address and port. If the same internal client sends a packet with the same source address and port to a different destination, a different port mapping is used. Only an external host that receives a packet can send a packet back to the internal host.

For the purposes of this application, a "restricted" NAT is any NAT other than a full cone NAT.

Some NATs support a behavior called "hairpinning." Hairpinning is a mechanism that allows two endpoints on the internal side of a NAT to communicate even if they only use each other's external IP addresses and port numbers.

Some NATs support a protocol called "UPnP" or "Universal Plug and Play." UPnP supports zero-configuration networking and automatic discovery, whereby a device can dynamically join a network, obtain an IP address, announce its name, convey its capabilities upon request, and learn about the presence and capabilities of other devices. In particular, clients connected to a UPnP-enabled NAT can use UPnP to discover, add, edit, or delete port mappings.

For NATs that will not allow an inbound connection through to an internal client before that internal client has first initiated an outbound connection, the technique of "hole punching" may be used by the internal client as an indirect way of instructing the NAT to forward inbound packets. Hole punching often involves a server other than the two clients that are attempting to communicate. For example, a Teredo client may establish a connection with a known Teredo server. The client may continuously send "bubble" packets to the server so that the NAT will forward packets from the server back to the client. If bubble packets are not sent, the port mappings on the client NAT may timeout, thereby not permitting further communications from the Teredo Server. If a second Teredo client, outside the NAT, needs to connect to the first Teredo client inside the NAT but packets from the second client cannot penetrate the NAT to reach the first client because of the NAT port-mapping behavior (as described above), the second client may be able to contact the Teredo server which in turn will send a message to the first client concerning the connection attempt. The first client can then send a bubble message to the second client. Depending on how the NAT is configured, it might then allow packets from the second client to be forwarded back to the first client.

IPv6 also provides mechanisms for a nodes on a network to discover each other's presence, to determine each other's link-layer addresses, and find routers and maintain reachability information about the paths to active neighbors. Many of these mechanisms are described in RFC 2461 (entitled "Neighbor Discovery for IP Version 6 (IPv6)"). In particular, a "Neighbor Solicitation" or "NS" message is sent by an IPv6 node to determine the link-layer address of a neighbor, or to verify that a neighbor is still reachable via a cached link-layer address. A "Neighbor Advertisement" or "NA" message is sent in response to a Neighbor Solicitation message. A node may also send unsolicited Neighbor Advertisement messages to announce a link-layer address change.

SUMMARY OF INVENTION

This Summary provides an illustrative context for aspects of the invention, in a simplified form. It is not intended to be used to determine the scope of the claimed subject matter. Aspects of the invention are described more fully below in the Detailed Description.

In one aspect of the invention, two or more IPv6-aware clients using Teredo are located behind the same NAT. Methods and systems are described for allowing these clients to communicate.

In another aspect of the invention, a Teredo client detects the type of NAT it is behind. Methods and systems are provided that enable this detection to occur more rapidly.

The various methods and systems described herein may be implemented separately or combined in various ways.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

According to one embodiment, the invention may be implemented in a network environment such as the Internet. The Internet includes an IPv6 Internet. The IPv6 Internet includes a number of devices, each with an IPv6 address. These IPv6 addresses are generally expressed as eight groups of four hexadecimal digits. For example, 2001:0db8:0000:0000:0000:0000:1428:57ab is a valid IPv6 address.

The Internet also includes an IPv4 Internet. The IPv6 Internet includes a number of devices, each with an IPv4 address. These IPv4 addresses are generally expressed as four groups of digits, where each digit is between 0 and 255. For example, 151.207.245.67 is a valid IPv4 address. Because the IPv6 Internet has a much larger addressing space, it has the potential to provide unique addresses for a much larger number of devices than the IPv4 Internet.

The IPv4 Internet includes at least one server and at least one relay that are each capable of communicating over both the IPv4 Internet and the IPv6 Internet. In one embodiment, the server and relay are each implemented according to the Teredo specification as a Teredo server and a Teredo relay respectively. The server and relay facilitate communications between clients on the IPv4 Internet and clients on the IPv6 Internet.

The IPv4 Internet also includes a private network that is behind a network address translation system (also referred to herein as a "NAT"). The NAT assigns a private IPv4 address to each client in its private network. That private IPv4 address is unique to the private network, but is not necessarily unique to the Internet at large. RFC 1918 describes certain IPv4 addresses that are reserved for such private networks. For example, 192.168.1.5 is a valid private IPv4 address.

In one embodiment, an IPv4 client that is on a private network behind a NAT sets up a connection with an IPv6 client on the IPv6 Internet. The IPv4 client that is behind the NAT first obtains an IPv6 address for itself. Typically, the first 32 bits of that client's IPv6 address are set to the reserved Teredo prefix, 2001:0000. The next 32 bits embed the primary IPv4 address of the Teredo server with which the client will communicate. The next 16 bits define flags. In some implementations, these bits indicate whether the Teredo client is located behind a cone NAT or not. The next 16 bits encode the port number that is mapped by the NAT to the internal client. These bits will typically be inverted from the actual port number. Finally, the remaining 32 bits encode the public IPv4 address of the NAT. These bits are also generally inverted.

IPV6 Teredo Address Detection

Figure 1:
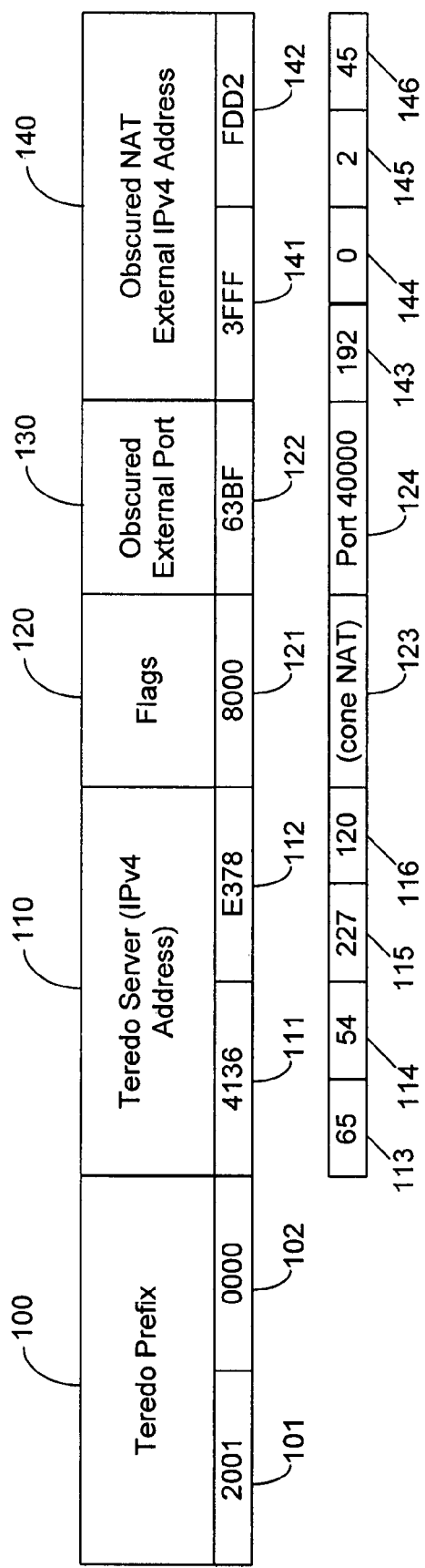
FIG. 1 is a schematic depiction of a Teredo IPv6 address.

FIG. 1 depicts an example IPv6 Teredo address of a client on a private network behind a NAT. The IPv6 address includes eight groups of four hexadecimal digits. The Teredo Prefix 100 includes the first two groups of hexadecimal digits (or sixteen bits); in this case, the IPv6 address uses the reserved prefix 2001:0000 101-102 to indicate that the address is a Teredo address. The next sixteen bits encode the IPv4 address of the Teredo Server 110. The IPv4 address in this example is 65.54.227.120 (113, 114, 115, 116), which is equivalent to 4136E378 111-112 in hexadecimal. The next eight bits encode various flags 120. In the depicted example, the first bit is set, thus resulting in the hexadecimal code 8000 121, indicating that the client is behind a cone NAT 123. The following eight bits encode the external port that the NAT has mapped to the client 130. This port number is obscured with the operator xor FFFF, thus port 40000 124 is encoded as 63BF 122. Finally, the latest sixteen bits of the IPv6 address encode the external IPv4 address of the NAT device on the network 140. These digits are also obscured by the xor operator with FFFF, thus the example IPv4 address 192.0.2.45 (143, 144, 145, 146) become the hexadecimal code 3FFF:FDD2 141-142. Thus, the final address in this figure for the Teredo client behind a NAT device is 2001:0000:4136:E378:8000:63Bf:3FFF:FDD2 (101, 102, 111, 112, 121, 122, 141, 142).

In order to determine its full Teredo IPv6 address, in some embodiments, the client behind the NAT first connects with a Teredo server. Since the NAT translates the source IP address and the source port as it forwards packets from the internal host, the Teredo server will receive the request as appearing to originate from the translated address. It can then respond back to the Teredo client with the information that the client needs to construct its complete IPv6 address.

Figure 2:
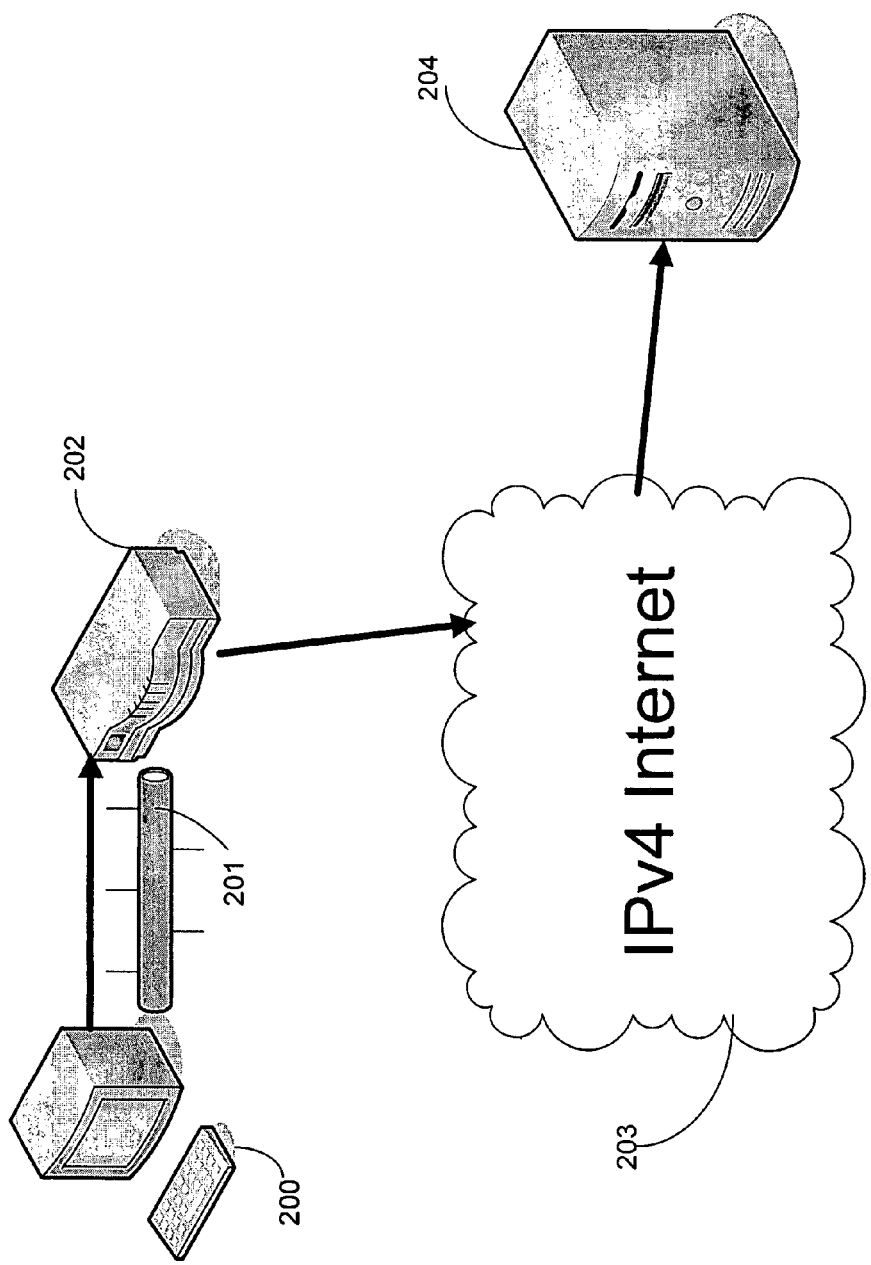
FIG. 2 depicts a Teredo client that is connected to the IPv4 Internet through a NAT device sending a packet to a Teredo server.
Figure 3:
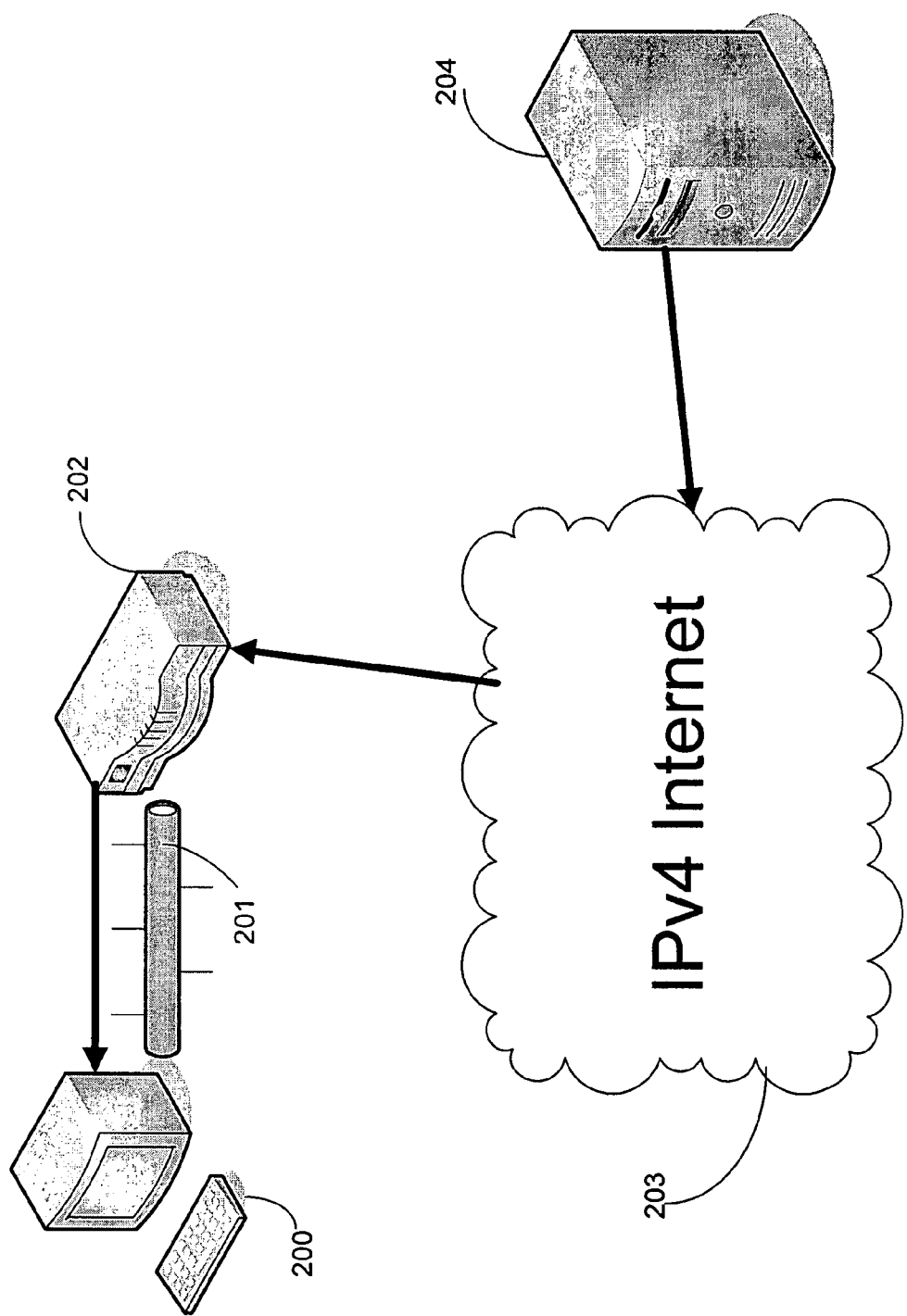
FIG. 3 depicts a Teredo server sending a message through the IPv4 Internet back to a Teredo client through a NAT device.

An example of the process of Teredo IPv6 address detection is illustrated in FIG. 2 and FIG. 3. In FIG. 2, the Teredo client 200 sends an IPv4 packet to a Teredo server 204. The client 200 is connected to a NAT 202 through an Ethernet connection 201. In some embodiments, a UDP packet is sent to port 3544 for the purposes of address detection. In some embodiments, this packet is called a "Router Solicitation" (or RS) message. One implementation of the Router Solicitation message is described in RFC 2461 (entitled "Neighbor Discovery for IP Version 6 (IPv6)"). The packet is sent from the client 200 to the NAT 202 through the Ethernet connection 201, at which point the NAT 202 modifies the source IP address to be the external IPv4 address of the NAT 202. The NAT 202 also modifies the source port and adds the new source port to a routing table so that later-received incoming packets will be properly forwarded back to the internal client 200. The NAT 202 then forwards the packet to the Teredo server 204 through the IPv4 Internet 203.

As shows in FIG. 3, the Teredo server 204 then sends a return packet back to the internal client 200, again through the IPv4 Internet 203. The return packet includes information that can be processed by the internal client 200 to determine the external IP address of the NAT 202 as well as the source port of packets that were forwarded from the internal client 200 to the server 204 through the NAT 202. In some embodiments, the packet is called a "Router Advertisement" (or RA) message, also defined in RFC 2461. When the return packet arrives at the NAT 202, the NAT forwards the packet back to the client 200 on the basis of the destination port. Once this process is complete, the internal client 200 will have all the information it needs to form a synthetic Teredo IPv6 address, as shown in FIG. 1. That synthetic address can then serve as a mechanism for reaching the internal client 200 from the IPv6 Internet and vice-versa.

NAT-Type Detection

In addition to informing the client 200 of its external IP address and source port, the Teredo server 204 can be used by the client 200 in some embodiments to determine the type of NAT 202 that the client 200 is behind. In one embodiment, the server 204 has two distinct IPv4 addresses. In another embodiment, two different servers, each with its own IPv4 address, can also be used by the client 200 to detect the type of NAT 202 it is behind. Once the server 204 receives the initial packet from the client 200, the server 204 can attempt to reach the client 200 using a different source IPv4 address than the destination IPv4 address of the initial request from the client 200. If the packet from the different IPv4 address successfully reaches the client 200, then the client 200 can assume that all traffic to its source port will be forwarded by the NAT 202, regardless of the origin IP address. The client 200 can conclude that the NAT 202 is a full cone NAT, and set the flags 121 in its Teredo address accordingly. If the return packet does not arrive, then the NAT 202 may be a port- or address-restricted NAT, or a symmetric NAT, in which case external hosts will not be able to reach the internal client 200 without additional measures described in more detail below.

Faster NAT Detection

In order to determine whether the client 200 is behind a full cone NAT 202, however, it is necessary for the client 200 to wait some period of time to determine if a second return packet will arrive. In one aspect of the present invention, the client 200 does not wait for a return packet, but instead treats all NATs as "restricted" NATs. According to this aspect of the invention, the Teredo client 200 is able to determine its complete IPv6 address in the amount of time it takes for the packet to travel from the client 200 to the server 204 and then for the server 204 to respond back. This method may be advantageous because it simplifies and expedites the Teredo detection process.

Communication Where Both Clients and Behind Full Cone NAT

Figure 4:
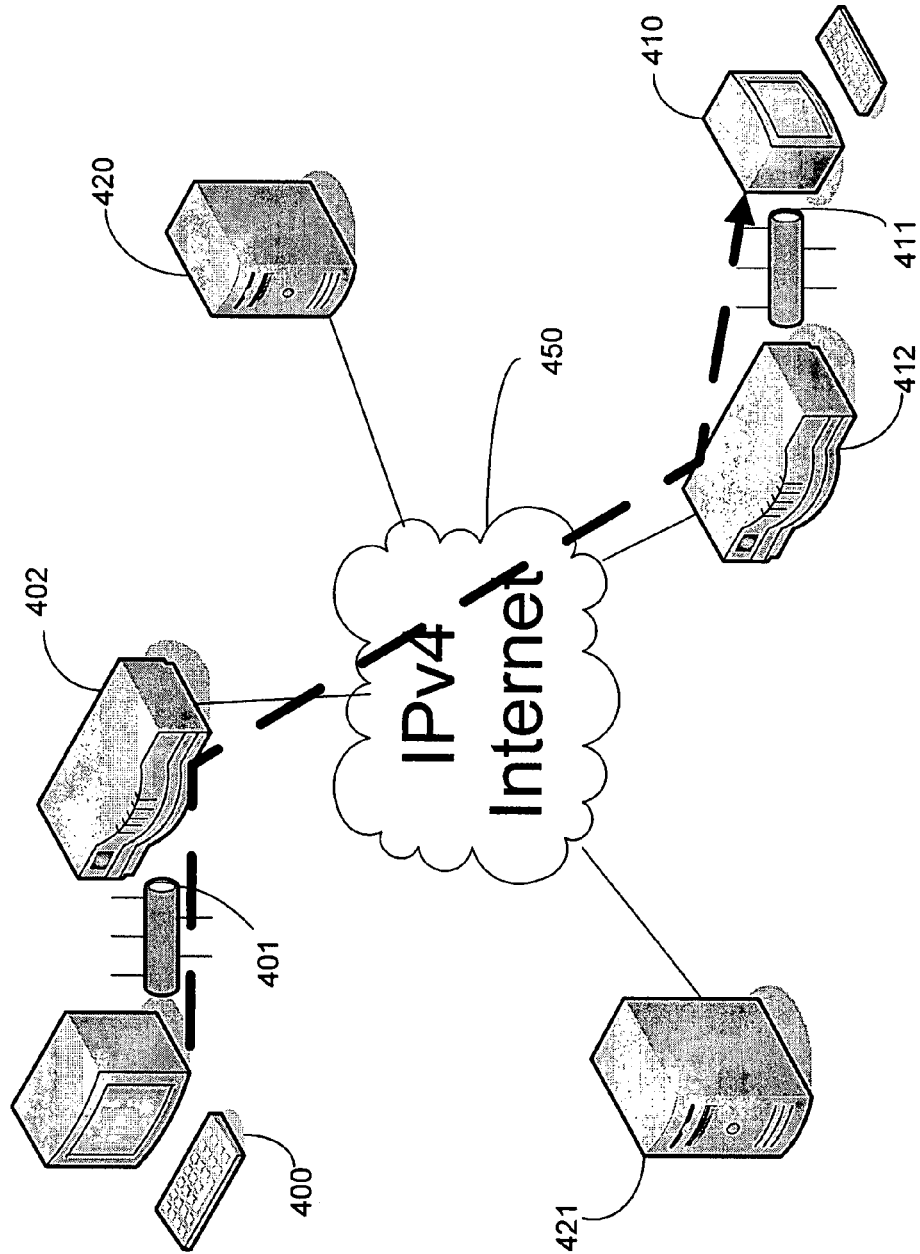
FIG. 4 depicts two Teredo clients communicating through the IPv4 Internet.

In FIG. 4, a first Teredo client 400 is depicted communicating with a second Teredo client 410. In this example, both the first client 400 and the second client 410 are each behind a full cone NAT, respectively a first cone NAT 402 and a second cone NAT 412. The internal connection (between the client and the NAT) is depicted in this example as an Ethernet connection, a first Ethernet connection 401 for the first client 400, and a second Ethernet connection 411 for the second client 410. The first client 400 discovers the information it needs to construct its Teredo address from a first Teredo server 420, as described above. The second client 410 likewise discovers the information it needs from a second Teredo server 421. (It is also possible that both clients detect the Teredo address information from the same server.) If both the first NAT 402 and the second NAT 412 are full cone NATs, the first client 400 will be able to communicate directly with the second client 410 through the IPv4 Internet 450 without the need for any relay or bubble packets.

Hairpinning-Independent Communication

Some NATs have built-in support for "hairpinning." Hairpinning is a mechanism that allows two endpoints that are within the same NAT to communicate, even if they attempt to connect to each other's external IP addresses and source ports.

Figure 5:
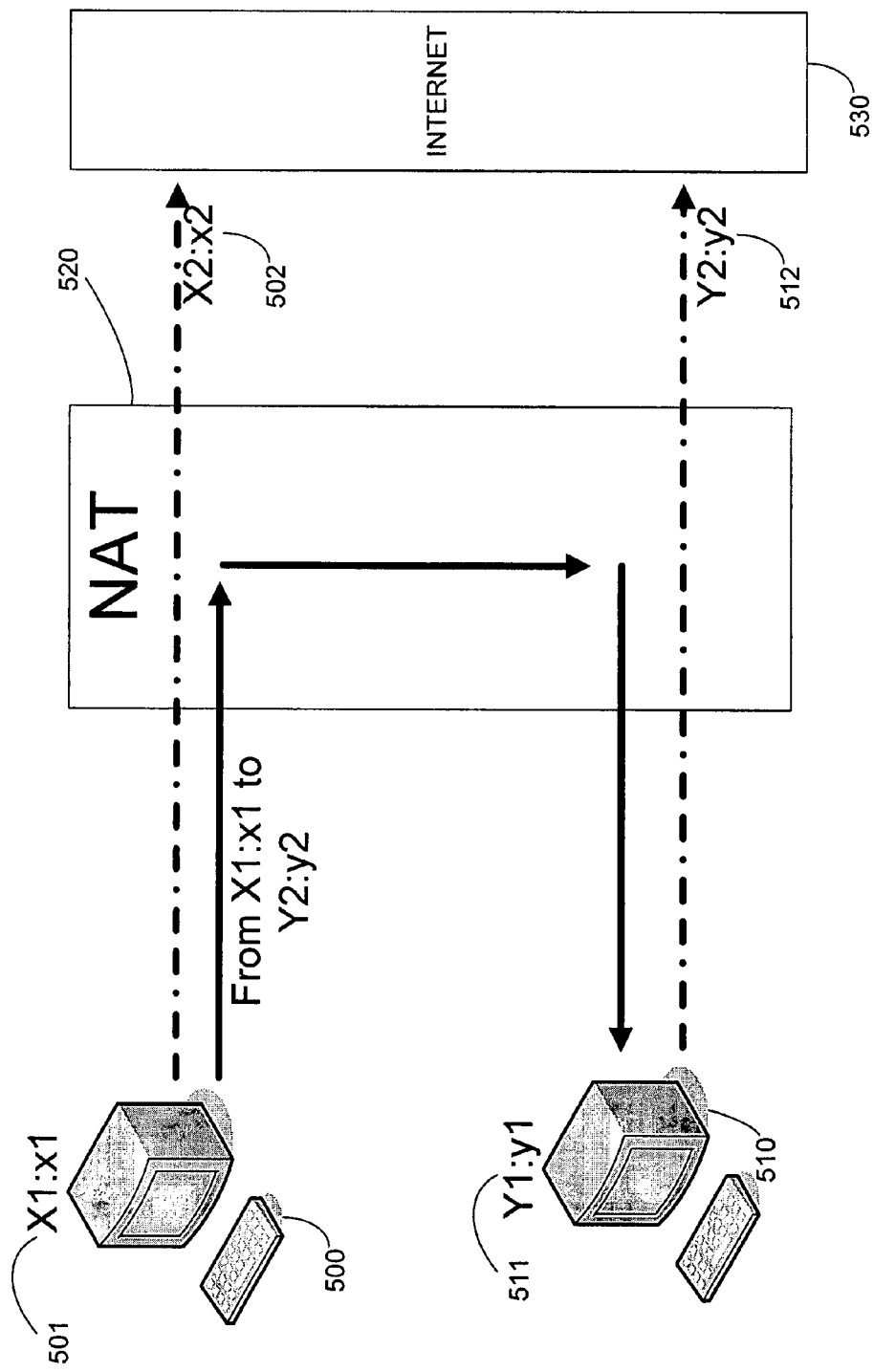
FIG. 5 depicts a NAT that supports hairpinning.

FIG. 5 illustrates a simplified example of hairpinning that could be performed by a NAT. FIG. 5 shows two clients, a first client 500 and a second client 510. Both clients are behind the same NAT 520. The NAT 520 provides both clients with a connection to the Internet 530. In a more complex example, any number of NATs could be between the internal clients and the Internet, and the two internal clients might each have a different number of layers of NATs between it and the Internet.

X1:x1 501 represents the internal IP address and source port of a packet from the first client 500. When the first client 500 sends a packet to the Internet 530, the NAT 520 maps the internal IP address and source port X1:x1 501 to an external IP address and source port X2:x2 502. Similarly, when the second client 510 sends a packet to the Internet 530, the NAT 520 maps the internal IP address and source port Y1:y1 511 to an external IP address and source port Y2:y2 512. Thus, traffic from the Internet for external address X2:x2 502 will be forwarded to the first client 501 at its internal IP address X1:x1 501, and likewise traffic from the Internet for external address Y2:y2 512 will be forwarded to the second client 510 at its internal IP address and port Y1:y1 511.

In NATs that support hairpinning, a packet originating from the first client 500 with a destination port of Y2:y2 512 will automatically be routed by the NAT 520 to the second client 510, even though both the first client 500 and the second client 510 are behind the same NAT 520. The traffic will not need to be routed through the Internet 530 (or any other network that is beyond the NAT 520 that both clients are behind). In other words, a NAT that supports hairpinning forwards packets originating from an internal address X1:x1 501, destined for an external address Y2:y2 512 that has an active mapping back to Y1:y1 511, back to that internal address Y1:y1 511.

Some NATs, however, do not support hairpinning. It is thus desirable, particularly in the context of Teredo addressing, to have a system whereby two or more clients behind a NAT or set of NATs can communicate with each other using the Teredo protocol even if the common NATs do not have native support for hairpinning.

Figure 6:
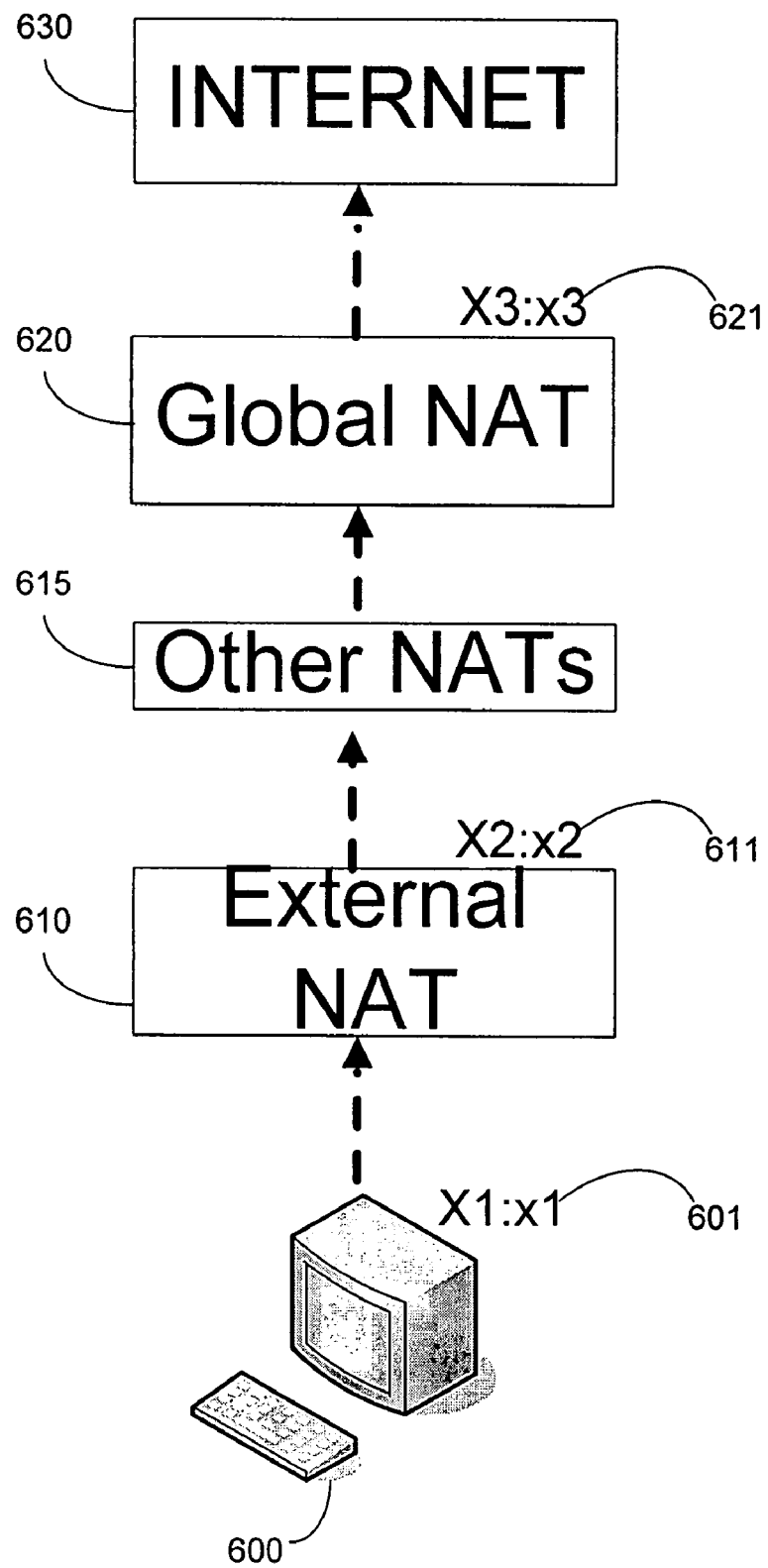
FIG. 6 depicts a network device connected to the Internet through several NATs.

There may be more than one NAT in between a client and the global Internet. FIG. 6 depicts an example where a client 600 is connected to an external NAT 610 which is connected to a global NAT 620 which is connected to the Internet 630. As packets are forwarded from the client 600 through the chain of NATs, a series of port and address mappings occur. In the example depicted in FIG. 6, the packet begins with the source IP address and source port X1:x1 601. This may be called the "local port mapping." After the packet is forwarded by the external NAT 610, the packet is mapped to the combination X2:x2 611. This mapping may be called the "external port mapping." Finally, when the packet is forwarded by the global NAT 620 to the Internet 630, the packet is mapped to the combination X3:x3 621, the "global port mapping." Note that any number of NATs may be placed between a client and the Internet, and the terms "local port mapping," "external port mapping," and "global port mapping" are only for the purposes of illustrating this example and are not a limiting feature of any aspect of the invention. NATs other than the external NAT 610 and the global NAT 620 are illustrated in FIG. 6 as 615. Note also that in the case where there is only one NAT between the client 600 and the Internet 630, the external NAT 610 will be the same as the global NAT 620, and the external port mapping 611 will be the same as the global port mapping 621.

According to the Teredo protocol, the client 600 can determine its local port mapping 601 locally without the assistance of any other device. The client 600 can also determine its global port mapping 621 from the Teredo server, where the global port mapping is the final address/port mapping that occurs before a packet is forwarded to the Internet. This port mapping is determined as explained above and illustrated in FIGS. 2 and 3. Finally, the client 600 can determine its external port mapping 611 if the external NAT 610 (that is, the NAT closest to the client 600) supports UPnP as discussed above. Once the client 600 has determined its local port mapping, external port mapping, and global port mapping, according to some embodiments of the invention, it is possible to eliminate dependence on hairpinning support in NATs.

Two embodiments are now described according to which clients using the Teredo protocol may communicate where they are both behind the same global NAT regardless of whether the NATs in the network have built-in hairpinning support.

Figure 7:
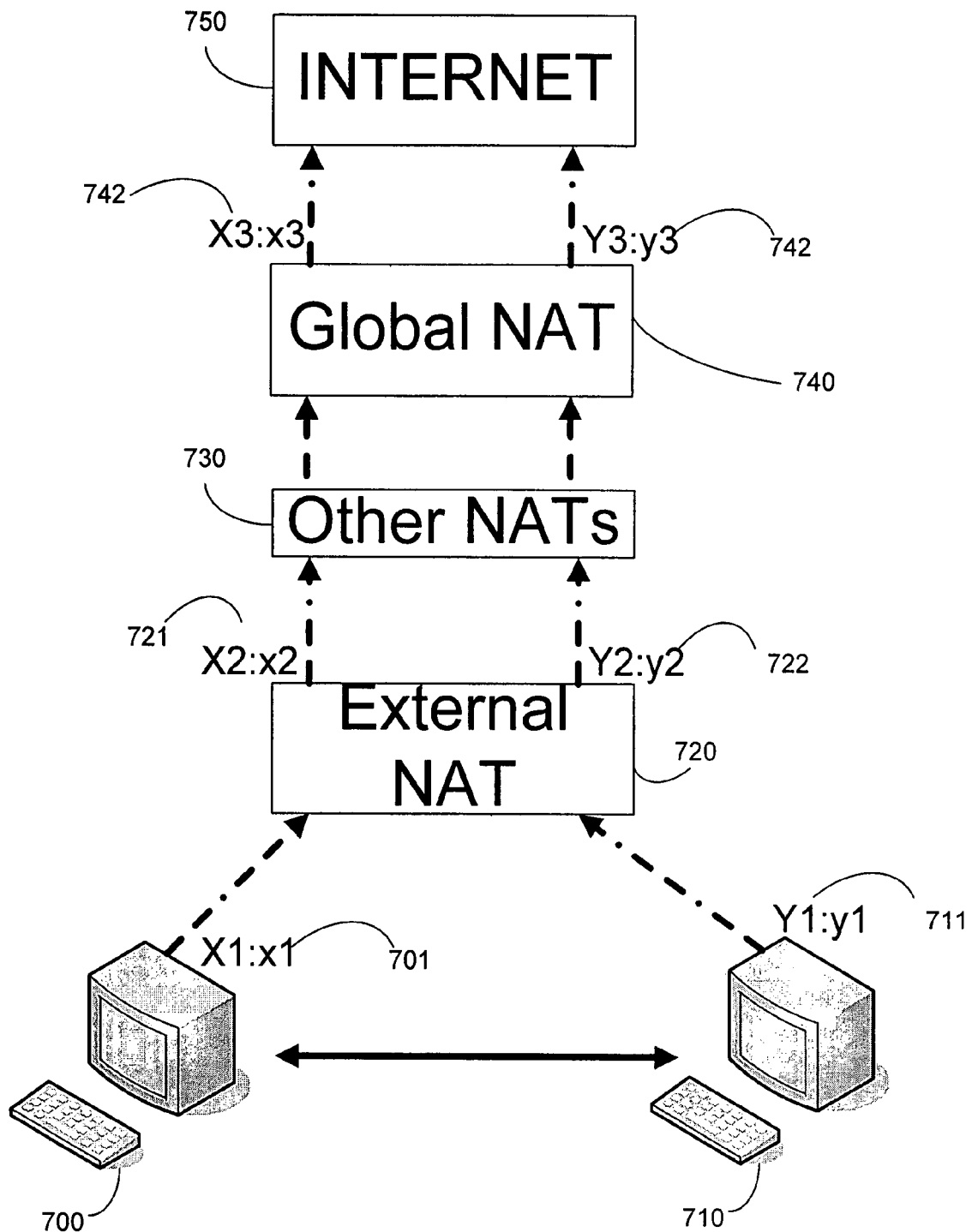
FIG. 7 depicts two network devices connected to the Internet through several NATs.

FIG. 7 depicts an embodiment according to one aspect of the invention. In this simplified example, there are two Teredo clients, a first client 700 and a second client 710. Both clients are behind the same external NAT 720. There may be any number of other NATs 730 between the external NAT 720 and a global NAT 740. In other embodiments, the external NAT 720 is connected directly to the global NAT 740. In other embodiments, the external NAT 720 is the same as the global NAT 740. The global NAT 740 is connected to the Internet 750, and has one or more public IP addresses.

Packets sent from the first client 700 have a local port mapping X1:x1 701, an external port mapping X2:x2 721, and a global port mapping X3:x3 742. Thus packets sent from the first client 700 to the Internet 750 will appear to originate from the IP address and port X3:x3 742. Likewise, the second client 710 has a local port mapping Y1:y1 711, an external port mapping Y2:y2 722, and a global port mapping 742.

The first client 700 may attempt to communicate with the second client 710 using its global port mapping Y3:y3 742. In this case, a packet will be sent from the first client 700 through the series of NATs 720, 730, and 740, and, in order to be successfully routed, will need to be sent back through those NATs to the second client 710. Ordinarily, for this process to be successful, the global NAT 740 will need to support hairpinning; however, not all NATs support such behavior and thus the packet may not be successfully routed.

In an embodiment of the invention, the first client 700 communicates with the second client 710 directly, regardless of whether the global NAT 740 supports hairpinning. If the first client 700 can discover the local port mapping of the second client 710 Y1:y1 711, then it can establish a direct communication with the second client 700 without having to rely on hairpinning support in the global NAT 740.

Figure 8:
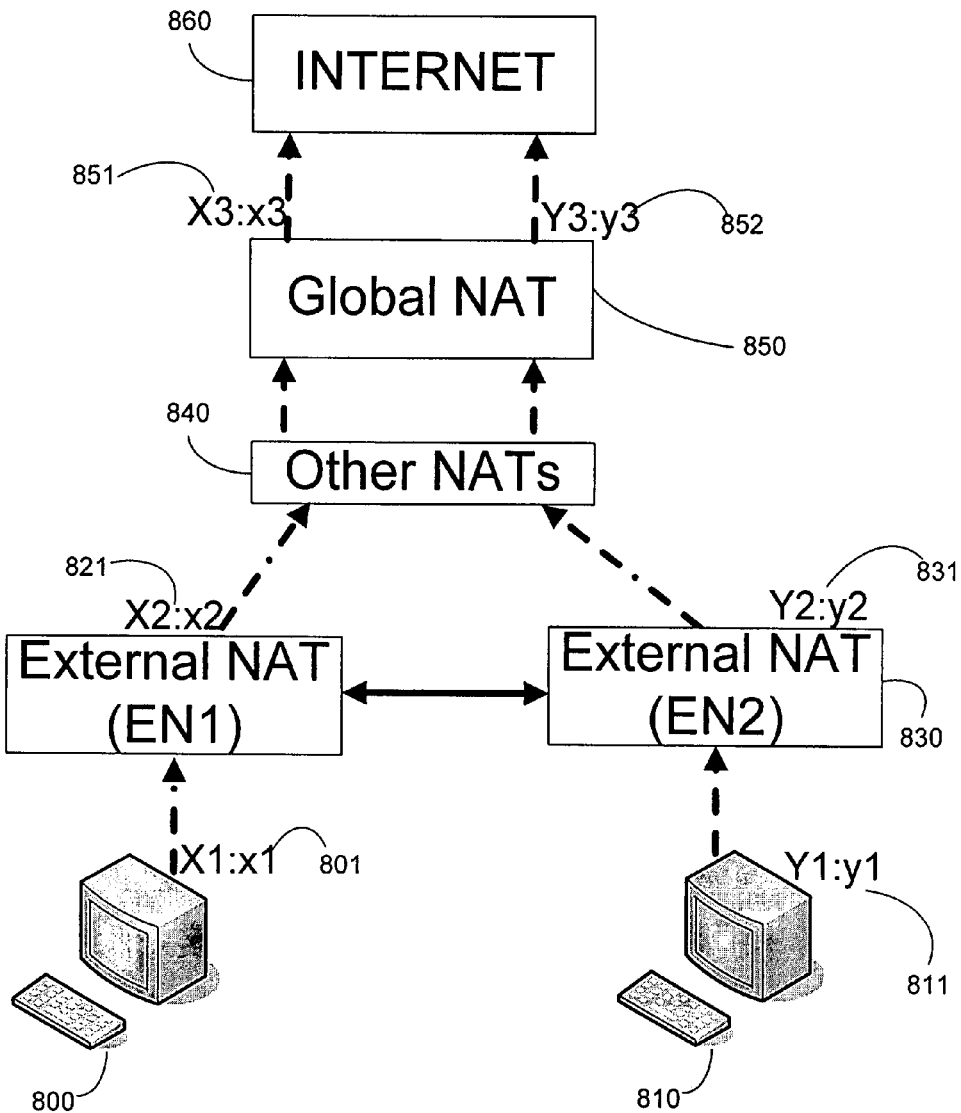
FIG. 8 depicts two network devices connected to the Internet through several NATs.

In another embodiment, depicted in FIG. 8, there are also two clients, a first client 800 and a second client 810. The embodiment depicted in FIG. 8 is similar to that of FIG. 7, except that in the FIG. 8 example, the first client 800 is behind a first external NAT (EN1) 821, and the second client 810 is behind a second external NAT (EN2) 830. Both external NATs, however, are behind the same global NAT 850, and optionally behind other NATS 840. Also as in FIG. 7, packets may undergo port and address mapping as they are forwarded from one NAT to the next.

In the embodiment depicted in FIG. 8, the first client 800 can communicate with the second client 810 without relying on hairpinning in the global NAT 850 if it can discover the external mapping of the second client 810 on external NAT (EN2) 830 Y2:y2 831. Likewise, the second client 810 can communicate directly with the first client 800 without the need for NAT hairpinning support if it can discover the first client's 800 external mapping X2:x2 821.

The embodiments depicted in FIG.7 and FIG. 8 could be extended to all intermediate NATs leading up to a global NAT in the case of a multi-layered NAT topology so long as there is some way for the clients to discover the external port mapping of the intermediate NATs.

According to some embodiments of the invention, the clients discover their external port mapping using UPnP. As noted above, UPnP is a standard protocol by which a client can discover, set, add, edit, or delete port mappings on a NAT. Although UPnP is one method by which clients behind a NAT may discover port mappings, any method may be used consistent with this aspect of the invention. The local port mapping, as described above, should already be known and under the control of the client, and the global port mapping, also as described above, can be determined by communication with the Teredo server.

Once the client behind the NAT has discovered its external port mapping(s), it communicates those port mapping(s) to other clients behind the same NAT so that they can communicate directly, even if the NATs don't have built-in support hairpinning. This aspect of the invention is not in any way limited to NATs without hairpinning support; however, it does allow for internal communication between clients using Teredo addresses even if one or more NATs in the network do not support hairpinning.

In some embodiments of the invention, messages sent by the Teredo clients are modified to advertise all available mappings. A peer may then attempt to establish a connection to all available mappings. Since hairpinning is a concern only among peers that are situated behind NATs, according to some embodiments, only bubble messages are modified to communicate the mappings, although any method may be used to communicate the mappings to other clients. In some embodiments, the mappings are added to bubble messages as part of the Teredo trailer. When a client receives a bubble message with additional advertised mappings, the client may attempt to establish a connection to each of the advertising mappings along with the global mapping. When the client is successful, it can use the successful mapping to communicate with the peer and ignore the other mappings.

According to the Teredo protocol, a Teredo bubble may have the following format:

| UDP Header | TEREDO Options | IPv6 Packet | TEREDO Trailer |
|---|---|---|---|

The Teredo trailer is defined to be a concatenation of successive TLV (Type, Length, Value) fields. A unique Type is defined for the various kinds of data to be carried as part of the trailer. In an embodiment, two additional Teredo trailer types are defined to carry the port-mapping information. For example, following is exemplary code defining additional trailers:

```
typedef enum {
    TeredoTrailerBlank,         // Unused trailer value
    TeredoTrailerNonce,         // The Nonce trailer
    TeredoTrailerOrigin,        // The Origin trailer
    TeredoTrailerPortMapping,   // The Port Mapping trailer
    TeredoTrailerMax,
} TEREDO_TRAILER_TYPE, *PTEREDO_TRAILER_TYPE;
```

The enumeration "TeredoTrailerPortMapping" is used here to advertise the additional mappings discovered by a client. An example of the TeredoTrailerPortMapping trailer is provided below:

| |
|---|
| Type = TeredoTrailerPortMapping |
| Length = 12 |
| IPv4 Address (4 Bytes) |
| Port Number 1 (2 Bytes) |
| IPv4 Address 2 (4 Bytes) |
| Port Number 2 (2 Bytes) |

Each port mapping thus uses six bytes, four for the IPv4 address and two for the port number. Thus, according to this embodiment, the length will be a multiple of six depending on the number of port mappings advertised in the trailer.

Teredo Server Load Reduction

In another aspect, the Teredo client 200 periodically sends a "bubble" packet to the Teredo server 204, thus insuring that the port mapping established by the NAT 202 remains active and that the server 204 will be able to send packets directly to the client 200. Typically, the bubble packet will be a UDP packet sent every 30 seconds, but any duration can be used so long as the translation at the NAT 202 remains alive.

Teredo provides for both "direct" and "indirect" bubbles. A direct bubble, as described above, is sent directly by a client to the mapped IPv4 address and mapped UDP port of a peer. The client can determine the mapped IPv4 address and mapped port of the peer from the Teredo address which, as described above, encodes that information. An indirect bubble, by contrast, is sent through a destination peer's Teredo server, which forwards the bubble to the destination peer. The peer's Teredo address also encodes the peer's Teredo server.

In one aspect of the invention, the amount of traffic to the Teredo server is reduced, as described below.

In the case where a Teredo client has established a connection with a Teredo peer and the communication has been dormant for some period of time a while and is then revived, the client may send indirect bubbles to the peer through the Teredo server. These indirect bubbles may put an extra load on the Teredo server and are unnecessary when the connection endpoint of the Teredo peer is already known to the Teredo client. In some embodiments, indirect bubbles (sent through the Teredo server) are replaced with direct bubbles.

In another embodiment, a first Teredo client communicates with a second client directly connected to the Internet without any intervening NATs. According to this embodiment, the Teredo client does not need to send bubbles (direct or indirect), since the second client does not need continued traffic to maintain a port mapping.

When a Teredo connection is being established, typically a first client sends indirect bubbles encapsulating a Neighbor Solicitation message ("NS") through a Teredo server to discover other Teredo clients. When the indirect bubbles are received by a Teredo peer, they are translated back to Neighbor Solicitations. Relaying Neighbor Solicitation through a Teredo server in the form of indirect bubbles may be useful when the Teredo client hasn't yet determined a Teredo peer's mapping and there is no state setup in the Teredo peer's NAT to accept direct packets received from the Teredo client.

After a connection is setup, the Teredo client knows the Teredo peer's mapping and the Teredo peer's NAT mapping is open. In some implementations, however, Neighbor Solicitations from the IPv6 stack continue to be mapped into indirect bubbles and Neighbor Advertisements are mapped into direct bubbles. Accordingly, when indirect bubbles are received, a Teredo client may map it to a Neighbor Solicitation and sends it down the IPv6 stacks. Similarly, when direct bubbles are received the Teredo client may map it to a Neighbor Advertisement and sends it down the IPv6 stack.

Given that, according to this description, Neighbor Solicitations may be received whenever the communication between two clients is dormant for a certain period of time, there may be an unnecessary load imposed on Teredo servers relaying indirect bubbles that encapsulate Neighbor Solicitation messages. Accordingly, in one aspect of the invention, once a direct connection has been established between a Teredo client and a Teredo peer, the Teredo client knows the mapping that must be used to get through to the Teredo peer's NAT and the NAT is in a state to forward packets from the client through to the Peer. Thus, Neighbor Solicitations received from the IPv6 stack need not be translated to indirect bubbles. Instead, in some embodiments, Neighbor Solicitations are translated into direct bubbles, thus avoiding sending unnecessary traffic through the Teredo server.

According to the embodiment described above, it cannot be assumed that all indirect bubbles contain Neighbor Solicitations and all direct bubbles contain Neighbor Advertisements. Thus, to differentiate a direct bubble that represents a Neighbor Solicitation from a direct bubble that represents a Neighbor Advertisement, in some embodiments, a new Teredo trailer is added to the direct bubble. As described above, the Teredo bubble typically contains a Teredo trailer, and the Teredo trailer typically encodes a Type, Length, and Value. In some embodiments, the Type field is set to the value four (4). The Length field is also set to four (4) since the discovery type values is described using four (4) bytes. There are essentially two values that the Discovery Value field can take: zero (0) which identifies a Neighbor Solicitation packet and one (1) which identifies a Neighbor Advertisement packet. Both values may be transmitted in the host-byte order in the little-endian format.

In some instances, a NAT mapping may be lost according to this embodiment. Thus, if the peer's NAT were to lose the NAT mapping then direct bubbles sent by the Teredo client would be dropped by the peer's NAT. Accordingly, in some embodiments, a fallback mechanism is provided if communication by a client with a peer cannot be established in a certain time period. Typically, the IPv6 stack generates two kinds of Neighbor Solicitation messages. The first is a Multicast Neighbor Solicitation that is sent to a multicast destination address if the client has never communicated with the peer before, or if attempts to use a Unicast Neighbor Solicitation have failed. The second is a Unicast Neighbor Solicitation that is used to simply reestablish connectivity with a peer with which the client has previously communicated. According to one embodiment, only the Unicast Neighbor Solicitation messages are mapped to direct bubbles and the Multicast Neighbor Solicitation messages are mapped to indirect bubbles. Furthermore according to this embodiment, if a Unicast Neighbor Solicitation is received 30 seconds after the last communication from the peer, the Unicast Neighbor Solicitation may also be mapped to an indirect bubble. Thus, this aspect provides mechanisms to fall back to indirect bubbles if direct bubbles are not able to restore connectivity.

Following are some examples in according with some embodiments of the invention.

When a client receives a Neighbor Solicitation message from a Teredo Tunnel, the Teredo client first checks to see if the destination address on the Neighborhood Solicitation message is a multicast address. If the destination address is not a multicast address, the client then verifies that it has received a packet from the Teredo peer in the last thirty seconds. If the client has received such a packet, the Neighbor Solicitation may be mapped to a direct bubble that contains the Teredo Neighbor Discovery Trailer with value equal to 0. If the client has not received such a packet, the Neighbor Solicitation may be mapped to an Indirect bubble.

In another example, when a Neighbor Advertisement message is received from the Teredo Tunnel, the Teredo client maps the message to a direct bubble containing the Teredo Neighbor Discovery Trailer with value equal to 1.

In another example, when an indirect bubble is received from the Teredo server, the Teredo client maps it to a Multicast Neighbor Solicitation packet.

In another example, when a direct bubble is received from the Teredo peer, the Teredo client first checks to see if the value in the Teredo Neighbor Discovery Trailer has a value equal to zero. If the Teredo Neighbor Discovery Trailer is equal to zero, the client maps the direct bubble to a Unicast Neighbor Solicitation packet. Otherwise, if the value of the Teredo Neighbor Discovery Trailer is equal to one, then the client may map the direct bubble to a solicited Neighbor Advertisement.

Figure 9:
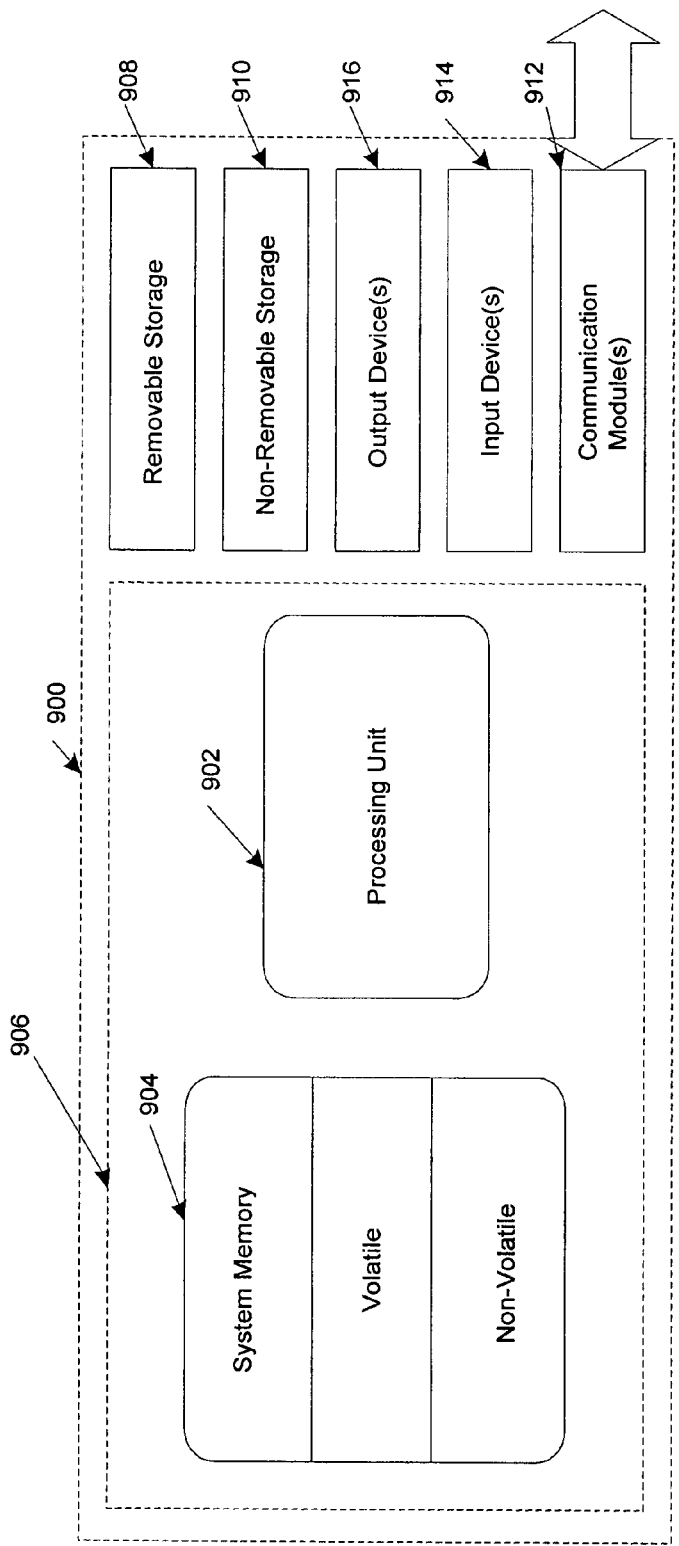
FIG. 9 depicts a system for implementing some embodiments of the invention.

A general-purpose computing system will now be described, on which embodiments of the invention may be implemented. With reference to FIG. 9, an exemplary system for implementing embodiments of the invention includes a computing device, such as computing device 900, which may be a device suitable to function as a node of network environment. Computing device 900 may include at least one processing unit 902 and memory 904. Depending on the exact configuration and type of computing device, memory 904 may be volatile (such as RAM), non-volatile (such as ROM, flash memory, etc.) or some combination of the two. This most basic configuration is illustrated in FIG. 13 by dashed line 906. Additionally, device 900 may also have additional features/functionality. Memory 904 is a form of computer-readable media that may store instructions, having wireless medium parameters for various nodes in network environment.

Device 900 may include at least some form of computer readable media. Computer readable media can be any available media that can be accessed by device 900. By way of example, and not limitation, computer readable media may comprise computer storage media and communication media. For example, device 900 may also include additional storage (removable and/or non-removable) including, but not limited to, magnetic or optical disks or tape. Such additional storage is illustrated in FIG. 13 by removable storage 908 and non-removable storage 910. Computer storage media includes volatile and nonvolatile, removable and non-removable media implemented in any method or technology for storage of information such as computer readable instructions, data structures, program modules or other data. Memory 904, removable storage 908 and non-removable storage 910 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 900. Any such computer storage media may be part of device 900.

Device 900 may also contain communications connection(s) 912 that allow the device to communicate with other devices. Communications connection(s) 912 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Device 900 may also have input device(s) 914 such as keyboard, mouse, pen, voice input device, touch input device, etc. Output device(s) 916 such as a display, speakers, printer, etc. may also be included. All these devices are well know in the art and need not be discussed at length here.

It should be appreciated that the invention is not limited to executing on any particular system or group of systems. For example, embodiments of the invention may run on one device or on a combination of devices. Also, it should be appreciated that the invention is not limited to any particular architecture, network, or communication protocol.

Having now described some embodiments of the invention, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention. The foregoing description and drawings are by way of example only. In particular, although many of the examples presented herein involve specific combinations of method acts or system elements, it should be understood that those acts and those elements may be combined in other ways to accomplish the same objectives. Acts, elements and features discussed only in connection with one embodiment are not intended to be excluded from a similar role in other embodiments.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. The use of "including," "comprising," or "having," "containing," "involving," and variations thereof herein, is meant to encompass the items listed thereafter and equivalents thereof as well as additional items.

What is claimed is:

1. A method for use by a first Teredo client, the method comprising:
   a) establishing a first connection to a second Teredo client by:
      i) receiving a Teredo address encoding a port mapping of a second Teredo client via a Teredo server, and
      ii) storing the port mapping; and
   b) establishing a second connection to the second Teredo client by:
      i) retrieving the stored port mapping,
      ii) sending a first packet to the port mapping on the second Teredo client,
      iii) sending a second packet to the port mapping on the second Teredo client, and
      iv) resending the second packet to the second Teredo client indirectly through a Teredo server if the first Teredo client does not receive a response to the sending of the second packet.

2. The method of claim 1, wherein sending the second packet comprises sending a Neighbor Solicitation message.

3. The method of claim 1, wherein resending the second packet comprises resending the second packet if a Neighbor Advertisement message is not received in response to the sending of the second packet.

4. The method of claim 1, wherein establishing the first connection to the second Teredo client comprises communicating with the second Teredo client via a network address translation device.

5. The method of claim 1, wherein establishing the first connection to the second Teredo client comprises communicating with the second Teredo client via a network without traversing a network address translation device.

6. The method of claim 1, wherein sending the second packet comprises sending a Teredo trailer.

7. The method of claim 6, further comprising generating a Teredo trailer indicating that the second packet is a Neighbor Solicitation message.

8. The method of claim 1, wherein the act of sending a first packet to the port mapping of the second Teredo client comprises sending a unicast packet to the port mapping of the second Teredo client, and
  wherein resending the second packet to the second Teredo client indirectly through the Teredo server comprises sending a multicast packet through the Teredo server.

9. The method of claim 1, wherein the act of establishing the second connection to the second Teredo client further comprises:
  determining whether the first Teredo client has a stored port mapping for the second Teredo client; and
  if the first Teredo client does not have a stored port mapping for the second Teredo client, sending a multicast packet through the Teredo server.

10. A system comprising:
  a first network device comprising a first Teredo client, wherein the first Teredo client is configured to maintain a data store of Teredo port mappings for at least one other Teredo client with which the first Teredo client has previously communicated, and is configured to use the data store to attempt to send a packet to a port mapping on a second Teredo client without relaying said packet through a Teredo server prior to attempting to relay the packet to a port mapping on a second Teredo client through a Teredo server.

11. The system of claim 10, wherein the packet is a Neighbor Solicitation message.

12. The system of claim 10, wherein the first Teredo client is further configured to recognize a packet received directly from a network node other than a Teredo server as a Neighbor Solicitation message.

13. The system of claim 12, wherein the first Teredo client is further configured to respond to a Neighbor Solicitation message received directly from a network node other than a Teredo server with a Neighbor Advertisement message.

14. The system of claim 10, wherein the first network device is a network interface card.

15. A computer-readable storage medium having computer-executable instructions encoded thereon that, as a result of being executed by a computer, instruct the computer to perform a method of network communication, the method comprising:
  receiving, at a first Teredo client, a message from a second Teredo client seeking to establish a connection to the first Teredo client;
  determining whether the message is a multicast message;
  determining whether a data store maintained on the first Teredo client includes a port mapping for the second Teredo client;
  when the message is a multicast message:
    attempting to respond to the message by communicating directly to the second Teredo client using a Teredo address of the second Teredo client prior to communicating to the second Teredo client indirectly through a Teredo server; and
  when the message is not a multicast message:
    responding to the message by communicating to the second Teredo client indirectly through a Teredo server.

16. The computer-readable storage medium of claim 15, wherein attempting to respond to the message comprises transmitting a Neighbor Advertisement message.

17. The computer-readable storage medium of claim 15, wherein the Teredo server is defined in the Teredo address of the second Teredo client.

18. The computer-readable storage medium of claim 15, wherein the Teredo address of the second Teredo client comprises a port mapping.

19. The computer-readable storage medium of claim 15, wherein the method further comprises determining whether the first Teredo client has received a previous message from the second Teredo client within a predetermined interval, and
  wherein the act of attempting comprises:
    if the first Teredo client has recently received another message from the second Teredo client, attempting to respond to the message by communicating directly to the second Teredo client prior to communicating to the second Teredo client indirectly through the Teredo server; and
    if the first Teredo client has not recently received another message from the second Teredo client, communicating to the second Teredo client indirectly through the Teredo server.

20. The computer-readable storage medium of claim 15, wherein the act of attempting comprises:
  if it is determined that the data store does include a port mapping for the second Teredo client, attempting to respond to the message by communicating directly to the second Teredo client prior to communicating to the second Teredo client indirectly through the Teredo server; and
  if it is determined that the data store does not include a port mapping for the second Teredo client, communicating to the second Teredo client indirectly through the Teredo server.

* * * * *